United States Patent
Tol et al.

(10) Patent No.: US 7,065,021 B2
(45) Date of Patent: Jun. 20, 2006

(54) METHOD AND DEVICES FOR STORING AND READING DATA ON A STORAGE MEDIUM IN ACCORDANCE WITH AT LEAST TWO FILE SYSTEMS, AND STORAGE MEDIUM FOR USE IN AT LEAST TWO FILE SYSTEM

(75) Inventors: Ronald Marcel Tol, Eindhoven (NL); Gerrit Jan Scholl, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 694 days.

(21) Appl. No.: 10/122,738

(22) Filed: Apr. 15, 2002

(65) Prior Publication Data

US 2002/0159369 A1    Oct. 31, 2002

(30) Foreign Application Priority Data

Apr. 25, 2001   (EP)   ................... 01201496

(51) Int. Cl.
*G11B 11/03*   (2006.01)
(52) U.S. Cl. .................... 369/53.2; 369/275.3
(58) Field of Classification Search ............ 369/13.05, 369/53.11, 53.2, 53.31, 59.25
See application file for complete search history.

(56) References Cited

U.S. PATENT DOCUMENTS

| | | | |
|---|---|---|---|
| 5,475,668 A | | 12/1995 | Azumatani et al. ............ 369/58 |
| 5,687,397 A | * | 11/1997 | Ohmori .................... 369/53.21 |
| 6,125,232 A | * | 9/2000 | Taira et al. .................... 386/95 |
| 6,504,993 B1 | * | 1/2003 | Matsumoto .............. 369/30.04 |
| 6,577,589 B1 | * | 6/2003 | Sawabe et al. .......... 369/275.3 |
| 6,760,540 B1 | * | 7/2004 | Yamamoto et al. ........... 386/95 |
| 6,813,681 B1 | * | 11/2004 | Kanota et al. ............. 369/47.1 |

OTHER PUBLICATIONS

"Packet Writing & CD Recording's Logic Next Step", XP-000972775, Emedia Professional, May 1997, pp. 30-38.
Patent Abstracts of Japan, "Information recording medium and information reproducing device", vol. 1997, No. 02, Publication No. 08272541, Publication Date Oct. 18, 1996, Inventor Misawa Seiichi.

* cited by examiner

*Primary Examiner*—Paul W. Huber
(74) *Attorney, Agent, or Firm*—Edward W. Goodman

(57) ABSTRACT

The invention relates to a method and devices for storing and reading data (5, 6) on a storage medium (17). In order to allow compatibility between different file systems (JAFS, UDF) data structures are stored in a first administrative area (10) as belonging to the first file system (JAFS) and a second administrative area (12) belonging to the second file system (UDF). Thus, a so-called bridge disc is achieved that may be read in the different file systems.

16 Claims, 2 Drawing Sheets

METHOD AND DEVICES FOR STORING AND READING DATA ON A STORAGE MEDIUM IN ACCORDANCE WITH AT LEAST TWO FILE SYSTEMS, AND STORAGE MEDIUM FOR USE IN AT LEAST TWO FILE SYSTEM

The invention relates to a method for storing data on a storage medium whereby the data is stored in at least one part of a data area and data structures representing the structures of said data are stored in a first administrative area.

Furthermore, the invention relates to a device for storing data on a storage medium that stores data in at least one part of a data area and data structures representing the structures of said data in a first administrative area of a first file system.

Furthermore, the invention relates to a device for reading data stored on a storage medium comprising reading means for reading data being stored in at least one part of a data area and data structures representing the structures of said data area and being stored in a first administrative area of a first file system.

Furthermore, the invention relates to a storage medium comprising a data area for storing data in at least one part of said data area and a first administrative area of a first file system for storing data structures representing the structures of said data.

In the field of Digital Video Recording (DVR) a specific file system, namely the so-called JAFS (Joint Approach File System), has been chosen to record digital video files on a DVR disc. Such a JAFS DVR disc comprises a lead-in area and a lead-out area and in between these areas the video files are written in a data area. Furthermore, such a DVR disc comprises a Management Information Area (MIA) for administrative purposes. The MIA stores the structures of the files contained in the DVR disc.

However, although in principle such DVR discs are suitable to be used in other electronic devices, such as in Personal Computers (PC), DVR discs containing video files according to the JAFS cannot be read in a PC since in the PC field a different file system, namely the so-called Universal Disc Format (UDF) file system is used. These two different file systems render it impossible to use in a PC a DVR disc containing video files in JAFS format being intended for use in a digital video recorder. Vice versa a DVR disc containing typical computer data according to the UDF file system cannot be read in a digital video recorder.

It is therefore an object of the invention to enable compatibility between different file systems.

This object is achieved by providing a method for storing data according to the above-mentioned type being characterized in that the data structures are further stored in a second administrative area of a second file system whereby the beginning of the second administrative area is written outside the first administrative area and outside the data area.

The object is further achieved by providing a device for storing data according to the above-mentioned type being characterized by writing means for writing the data structures in a second administrative area of a second file system thereby writing the beginning of the second administrative area outside of the first administrative area and outside said data area.

The object is further achieved by providing a device for reading data according to the above-mentioned type being characterized in that the reading means are designed for reading data structures stored in a second administrative area of a second file system representing the structures of said data, the beginning of said second administrative area being located outside the first administrative area and outside the data area.

The object is further achieved by providing a storage medium according to the above-mentioned type characterized by a second administrative area of a second file system for storing the data structures, the beginning of the second administrative area being located outside the first administrative area and outside said data area.

The invention allows to mirror the structures of a first file system, such as the JAFS in equivalents of the second file system, such as the UDF file system. As a result both JAFS and UDF file system have the same view on the stored data. This enables compatibility between the different file systems. In particular, the invention enables read compatibility with standard UDF implementations while maintaining read and write compatibility with a consumer recorder, in particular a digital video recorder.

Thus, a bridge application or bridge construction is achieved linking different file systems together rendering them compatible. This bridge application or bridge construction creates a bridge disc that is in particular readable by any PC with a UDF reader and readable and writable by any DVR consumer recorder.

The term "data structures" includes all kinds of structures relating to the data stored on the medium. In particular "data structures" includes volume structures representing the structures of logical and/or physical volumes, file structures representing the structures of files containing the data, and/or the space bitmap representing allocated and/or unallocated space for storing data on the medium. Such information stored in the administrative areas eases the handling and administration of the data stored on the medium.

Preferably, a first section of the first administrative area and a first section of the second administrative area is written respectively at different predetermined positions of the medium and if the respective space required for said administrative areas exceeds a predetermined size one or more further sections are written at arbitrary positions of the medium thereby marking that further sections in the respective other administrative area as occupied space. Thus, no limitation is given with regards to the amount of information stored in the administrative areas, as each administrative area may be divided in several parts. Thus, the flexibility and compatibility is further increased.

Preferably, data and/or file modification carried out by means of the first file system, e.g. JAFS, is determined and the administrative area of the second file system is updated. Thus, when a medium is re-inserted in a system using mainly the second file system the compatibility of the medium with both file systems is still guaranteed.

Alternatively, instead of just updating the administrative area of the second file system, the second administrative area is entirely rebuilt, thereby removing the previous stored second administrative area. Both alternatives enable to maintain compatibility even if the data and/or files have changed.

These and other aspects of the invention will be apparent from and elucidated with reference to the embodiments described hereinafter with reference to the accompanying drawings, in which.

Figure 1:
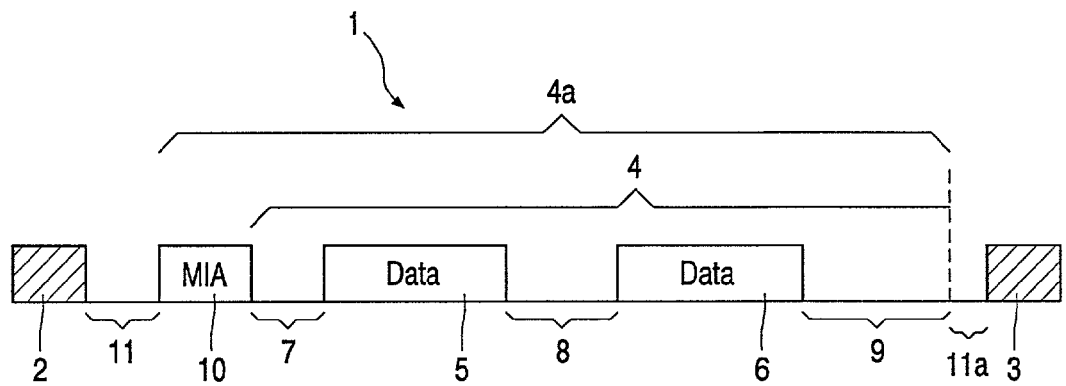
FIG. 1 shows a diagram of a JAFS-only disc.

FIG. 1 shows a diagram of a JAFS-only disc 1 consisting of a lead-in area 2 and a lead-out area 3. A data area 4 is located between the lead-in area 2 and the lead-out area 3 containing blocks 5, 6 of data and unused or unallocated disc space 7, 8, 9 between the blocks 5, 6 as well as before and behind these blocks.

Typically, the data stored in the blocks 5, 6 are video files. Therefore, such a JAFS-only disc 1 is commonly used in digital video recorders using the Joint Approach File System.

A first administrative area, namely a MIA 10 is located between the lead-in area 2 and the data area 4 being located at a fixed position within the JAFS-only disc, in particular at a fixed physical sector. However, between the lead-in area 2 and the MIA 10 there is a further region of unused or unallocated disc space 11 and between the data area 4 and the lead-out area 3 there is a further region of unused or unallocated disc space 1 1a being reserved for other file system usage.

It has to be noted that the MIA 10 may be extended into the data area 4 thereby dividing the MIA 10 in a plurality of MIA-parts, whereby some parts are located at the regions of previously unused disc space 7, 8, 9. Thus, a JAFS area 4a is defined as a combination of MIA 10 and the data area 4.

If such a JAFS-only disc 1 is inserted into a Personal Computer (PC), the PC commonly is not able to read that disc since the PC uses a different file system, namely a file system according to the UDF standard. Therefore, a JAFS/UDF bridge application is proposed, that writes both UDF and JAFS file system structures on the DVR disc. This enables to read compatibility with standard UDF implementations while maintaining read and write compatibility with a consumer recorder. Thereby, both file systems, namely the JAFS and the UDF file system have the same view on the stored data.

Figure 2:
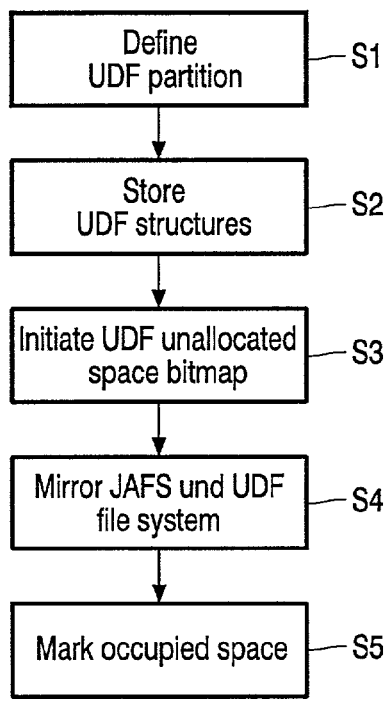
FIG. 2 shows a flow chart of a method to be carried out by a bridge application when a JAFS-only disc is inserted for the first time in a PC.
Figure 3:
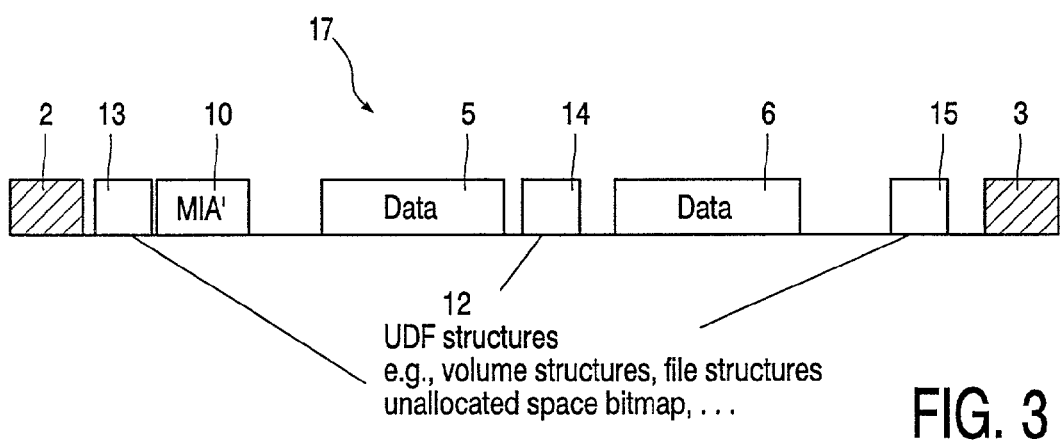
FIG. 3 shows a diagram of a JAFS-UDF bridge disc.

Reference is now made to FIGS. 2 and 3. FIG. 2 shows the steps carried out by the bridge application when such a JAFS-only disc 1 according to FIG. 1 is inserted in a PC for the first time: In a first step S1 a UDF partition is defined to start before or at the JAFS area 4a. Thus, for the different file systems JAFS and UDF their administrative areas, at least the beginnings of the administrative areas can be separated, namely the beginning of the first administrative area, e.g. the MIA, and the beginning of the second administrative area, e.g. the UDF structures by writing them in different partitions.

Subsequently, in step S2 a second administrative area, namely a UDF volume structure area 12 (FIG. 3) is stored on the disc, thereby starting this area outside this JAFS area at a position 13 and proceeding at positions 14, 15 inside this partition. In a further step S3 the UDF structures are initialized according to the administration in the MIA, in particular UDF unallocated space bitmap is initialized taking into account JAFS file system structures and disc regions.

Furthermore, according to step S4 the JAFS structures are mirrored in UDF equivalents. Thereby the structures are packed together to limit the number of disc regions that are to be used. Thereby file and directory entries for the administrative area of the UDF file system are created pointing to the same data as the MIA in the JAFS.

According to step S5 space occupied by UDF file system structure area 12 is marked in the JAFS using a disc recording chain, preferably using a hidden system file and/or being clearly marked as "UDF structures" thus creating a new administrative area, namely MIA'16.

The result is a JAFS-UDF bridge disc 17 according to FIG. 3. This JAFS-UDF bridge disc 17 contains the same video files arranged in the data blocks 5, 6 as in the JAFS-only disc 1 according to FIG. 1. Furthermore, the lead-in area 2 and lead-out area 3 remain unchanged while converting the JAFS-only disc 1 into a JAFS-UDF bridge disc 17. However, compared with the JAFS-only disc 1 the JAFS-UDF bridge disc 17 additionally comprises the UDF partition and the UDF structure area 12.

If write access is allowed to the UDF part of the disc, e.g. in order to allow deletion of a file, the bridge application can keep the JAFS view consistent or it can make the disc consistent upon closure, i.e. make the disc suitable for usage in a DVR recorder.

As a DVR recorder does not need to have knowledge of UDF, JAFS structures might be updated by the DVR recorder without updating the UDF structures. For example, on the DVR recorder, files may have been removed and new files may have been added. When such modifications have occurred and such a disc is re-inserted in a PC, the bridge application must check what changes have been applied.

Figure 4:
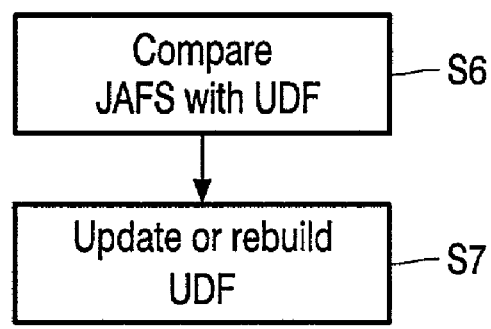
FIG. 4 shows a flow chart of a method carried out by the bridge application after re-insertion of the bridge disc in a PC.

FIG. 4 shows the steps to be taken by the bridge application after re-insertion of such a bridge disc 17 and after modifications of the data have been carried out.

In step S6 the bridge application compares the JAFS view with the UDF view in order to determine the modifications applied to the JAFS since the UDF file system was updated. Subsequently, in step S7 the UDF structures are updated according to the determined modifications. Alternatively, the UDF structures can be rebuilt in step S7 thereby removing the previously created structures used for the UDF view.

Preferably, the first administrative area, e.g. MIA is updated after the second administrative area, e.g. UDF structure area is built in order to mark space occupied by the second administrative area, in particular by using a disc record chain. Thus, it is prevented, that sectors of the medium allocated to the administrative area of the second file system are accessed by the first file system.

Furthermore, preferably, both the administrative area of the first file system and the administrative area of the second file system are updated or rebuilt after data and/or file modification carried out by the second file system. This may be done in real-time. This is convenient in order to allow editing of DVR recordings and files stored in a UDF file system.

It should be noted that some restrictions to the JAFS have to be defined to allow for UDF compatibility: A first restriction is that the start offset in the disc region record is restricted to 0. A further restriction is that the end offset in the disc region record is set to be sectorsize-1, except possibly for the last disc region record in a chain.

A further restriction for UDF may be made in order to allow for JAFS compatibility, namely that no defect management of the drive (spare area=0) is allowed.

In a further embodiment it is allowed, for symmetry reasons, that a standard UDF implementation also writes to a bridge disc. In this case a hidden system file "JAFS structures" is provided which may not be (re-)moved. The bridge application restores JAFS-UDF consistency after the UDF structures have been modified by determining the modifications applied to UDF file system since the JAFS file system was updated and applying only these modifications to the JAFS file system.

It should be noted, that the described bridge application is not restricted to JAFS-UDF bridges, but can equally be applied to JAFS and other file systems or UDF and other file systems, and even with different versions of UDF.

Figure 5:
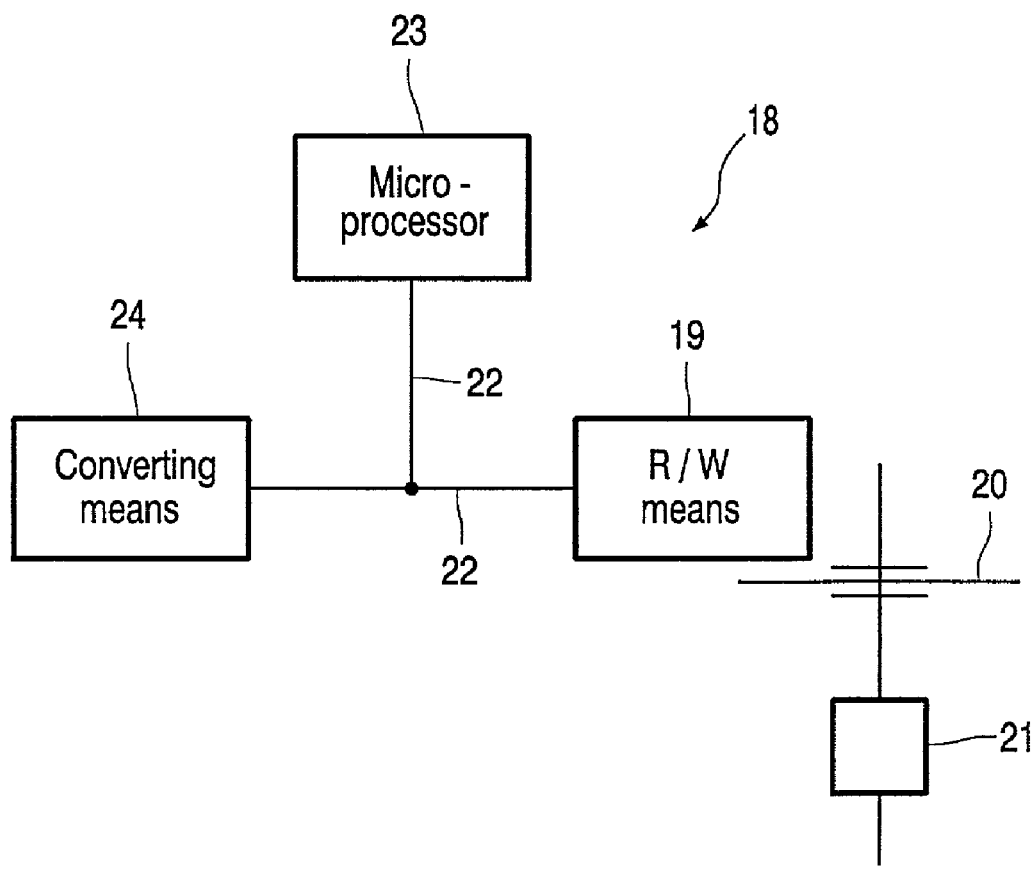
FIG. 5 shows a schematical diagram of a device for storing data on a JAFS-UDF bridge disc.

FIG. 5 shows a schematic diagram of a device 18 for storing data on a bridge disc. The device 18 comprises reading and writing means 19 for i.a. reading data from a disc 20 being driven by drive means 21. The reading means 19 are capable of reading data being stored on a JAFS-only disc as well as a JAFS-UDF bridge disc.

The administrative area of the JAFS, namely the MIA is read by the reading means 19 and transferred via a data bus 22 controlled by a microprocessor 23 to converting means 24 for converting the data structures of the JAFS into data structures of the UDF file system. These converted data structures are transferred via the data bus 22 to the writing means 19 writing the converted data structures in the second administrative area, namely the UDF structures of the UDF file system in order to create a bridge disc according to FIG. 3.

The present invention enables a PC to create and modify audio/video material on a DVR disc according to both the UDF and the JAFS standard. The resulting bridge disc is at least readable by any PC with the UDF reader and readable and writable by any DVR consumer recorder.

The invention claimed is:

1. A method for storing data on a storage medium, said method comprising the steps of:
    storing the data in at least one part of a data area;
    storing data structures representing the structures of said data in a first administrative area of a first file system; and
    storing said data structures in a second administrative area of a second file system, a beginning of the second administrative area being written outside the first administrative area outside said data area,
    wherein after data and/or file modification is carried out according to either said first file system or said second file system, said modification is determined and the file system not used for data and/or file modification is updated and/or rebuilt accordingly.

2. The method as claimed in claim 1, characterized in that a first section of the first administrative area and a first section of the second administrative area are written, respectively, at different predetermined positions of the medium, and if the respective space required for said administrative areas exceeds a predetermined size one or more further sections are written at arbitrary positions of the medium, thereby marking said further sections in the respective other administrative area as occupied space.

3. The method as claimed in claim 1, characterized in that volume structures representing the structures of logical and/or physical volumes, file structures representing the structures of files containing the data, and/or a space bitmap representing allocated and/or unallocated space for storing data are stored in said first and/or second administrative areas.

4. The method as claimed in claim 1, characterized in that a partition is defined for the second file system to start at an address outside or at the beginning of the area of the first tile system.

5. The method as claimed in claim 1, characterized in that said first and said second administrative areas contain file and directory entries pointing to the same data.

6. The method as claimed in claim 1, characterized in that the first administrative area is updated after the second administrative area is built in order to mark space occupied by the second administrative area, by using a disc record chain.

7. A device for storing data on a storage medium, said device comprising:
    means for storing data in at least one part of a data area and data structures representing the structures of said data in a first administrative area of a first file system; and
    writing means for writing said data structures in a second administrative area of a second file system, a beginning of the second administrative area being written outside the first administrative area and outside said data area,
    wherein after data and/or file modification is carried out according to either said first file system or said second file system, said modification is determined and the file system not used for data and/or file modification is updated and/or rebuilt accordingly.

8. The device as claimed in claim 7, characterized in that said device further comprises:
    converting means for converting the data structures of the first file system into data structures of a second file system, the second file system allowing the same view on the stored data as the first file system, wherein the writing means writes the converted data structures in the second administrative area of the second file system beginning outside the first administrative area and outside the data area.

9. A storage medium comprising:
    a data area for storing data in at least one part of said data area;
    a first administrative area of a first file system for storing data structures representing the structure of said data; and
    a second administrative area of a second file system for storm said data structures, a beginning of said second administrative area being located outside the first administrative area and outside the data area,
    wherein after data and/or file modification is carried out according to either said first file system or said second file system, said modification is determined and the file system not used data and/or file modification is updated and/or rebuilt accordingly.

10. The storage medium as claimed in claim 9, characterized in that
    a first section of the first administrative area and a first section of the second administrative area are respectively located at different predetermined positions of the medium and if the respective space required for said administrative areas exceeds a predetermined size, respectively, one or more further sections are located at arbitrary positions of the medium, and the respective other administrative area contains information indicating said further sections as occupied space.

11. A method for storing data on a storage medium, said method comprising the steps of:
    storing the data in at least one part of a data area;
    storing data structures representing the structures of said in a first administrative area of a first file system; and
    storing said data structures in a second administrative area of a second file system, a beginning of the second administrative area being written outside the first administrative area and outside said data area,
    wherein a first section of the first administrative area and a first section of the second administrative area are written, respectively, at different predetermined positions of the medium, and if the respective space required for said administrative areas exceeds a predetermined size one or more further sections are written at arbitrary positions of the medium, thereby marking said further sections in the respective other administrative area as occupied space.

12. The method as claimed in claim 11, characterized in that after data and/or tile modification is carried out by said first file system, said modification is determined and the second administrative area of said second file system is updated accordingly.

13. The method as claimed in claim 11, characterized in that after data and/or file modification carried out by said first file system, said modification is determined and the second administrative area of said second file system is rebuilt thereby removing the previous stored second administrative area.

14. The method as claimed in claim 11, characterized in that after data and/or file modification carried out by said second file system, the administrative areas of the first and second file systems are updated or rebuilt.

15. A method for storing data on a storage medium, said method comprising the steps of:

storing the data in at least one part of a data area;

storing data structures representing the structures of said data in a first administrative area of a first file system; and storing said data structures in a second administrative area of a second file system, a beginning of the second administrative area being written outside the first administrative area and outside said data area, wherein after data and/or file modification carried out by said first file system, said modification is determined and the second administrative area of said second file system is rebuilt thereby removing the previous stored second administrative area.

16. A storage medium comprising:

a data area for storing data in at least one part of said data area; and a first administrative area of a first file system for storing data structures representing the structure of said data, characterized in that said storage medium further comprises:

a second administrative area of a second file system for storing said data structures, a beginning of said second administrative area being located outside the first administrative area at outside the data area, wherein a first section of the first administrative area and a first section of the second administrative area are respectively located at different predetermined positions of the medium and if the respective space required for said administrative areas exceeds a predetermined size, respectively, one or more further sections are located at arbitrary positions of the medium, and the respective other administrative area contains information indicating said further sections as occupied space.

* * * * *